US012330460B2

(12) United States Patent
Kobayashi et al.

(10) Patent No.: US 12,330,460 B2
(45) Date of Patent: Jun. 17, 2025

(54) UPPER SUPPORT ASSEMBLY (71) Applicant: Sumitomo Riko Company Limited, Aichi (JP)

(72) Inventors: Kouichi Kobayashi, Aichi (JP); Katsuzou Okada, Aichi (JP); Kazuki Hotta, Aichi (JP); Takayuki Goto, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 0 days.

(21) Appl. No.: 18/939,486

(22) Filed: Nov. 6, 2024

(65) Prior Publication Data

US 2025/0162369 A1 May 22, 2025

(30) Foreign Application Priority Data

Nov. 16, 2023 (JP) .................. 2023-195480

(51) Int. Cl.
*B60G 15/06* (2006.01)

(52) U.S. Cl.
CPC .......... *B60G 15/067* (2013.01); *B60G 15/063* (2013.01); *B60G 2202/312* (2013.01); *B60G 2204/1242* (2013.01); *B60G 2204/128* (2013.01)

(58) Field of Classification Search
CPC .......... B60G 2204/1242; B60G 15/063; B60G 2202/312; B60G 15/067; F16F 1/387
See application file for complete search history.

(56) References Cited

U.S. PATENT DOCUMENTS

| 6,148,252 | A | * | 11/2000 | Iwasaki | B60G 17/0152 701/37 |
| 6,352,250 | B1 | * | 3/2002 | Tsuruta | B60G 15/067 267/140.4 |
| 9,611,913 | B2 | * | 4/2017 | Nagai | F16J 3/043 |
| 10,082,180 | B2 | * | 9/2018 | Nagashima | F16C 17/045 |
| 10,167,919 | B2 | * | 1/2019 | Miwa | F16J 3/04 |
| 11,472,250 | B2 | * | 10/2022 | Yamamoto | F16F 13/005 |
| 2015/0240903 | A1 | * | 8/2015 | Nagai | F16J 3/043 188/322.12 |
| 2017/0217274 | A1 | * | 8/2017 | Nagashima | F16C 17/04 |
| 2017/0321779 | A1 | * | 11/2017 | Miwa | F16J 3/042 |
| 2022/0266646 | A1 | * | 8/2022 | Yamamoto | B60G 15/04 |

(Continued)

FOREIGN PATENT DOCUMENTS

| DE | 10308193 B4 * | 2/2005 | .......... B60G 15/068 |
| DE | 102019104361 A1 * | 8/2019 | .......... B60G 15/065 |

(Continued)

*Primary Examiner* — Paul N Dickson
*Assistant Examiner* — Maxwell L Meshaka
(74) *Attorney, Agent, or Firm* — JCIPRNET (57) ABSTRACT An upper support assembly 10 includes an upper support 12 that attaches a shock absorber 84 to a vehicle body 90. The upper support 12 has a cylindrical holder 58 for mounting a bound stopper 94, and the cylindrical holder 85 protrudes downward from a portion that is overlapped with and fixed to the vehicle body 90. The cylindrical holder 58 has a tapered cylindrical shape that decreases in diameter toward a protruding tip, and a spring insulator 66 overlapped with an upper end portion of a coil spring 100, into which the shock absorber 84 is inserted, is fitted and mounted to an outer peripheral surface of the cylindrical holder 58.

7 Claims, 7 Drawing Sheets

(56) References Cited

U.S. PATENT DOCUMENTS

2024/0159291 A1* 5/2024 Hotta .................... F16F 9/3235
2025/0042477 A1* 2/2025 Goto ...................... F16F 1/373

FOREIGN PATENT DOCUMENTS

| EP | 0844419 A2 | * | 5/1998 | |
|----|----|----|----|----|
| JP | H0566354 U | * | 9/1993 | |
| JP | H08285002 A | * | 11/1996 | |
| JP | 2005069302 A | * | 3/2005 | ........... B60G 15/067 |
| JP | 2007154938 A | * | 6/2007 | ........... B60G 15/063 |
| KR | 20160105070 A | * | 9/2016 | |
| KR | 20200033219 A | * | 3/2020 | |
| KR | 20220071464 A | * | 5/2022 | |
| KR | 20220080246 A | * | 6/2022 | |
| WO | 2019146625 | | 8/2019 | |
| WO | WO-2021157408 A1 | * | 8/2021 | ............. B60G 11/52 |

* cited by examiner

UPPER SUPPORT ASSEMBLY

CROSS-REFERENCE TO RELATED APPLICATION

This application claims the priority benefits of Japanese application no. 2023-195480, filed on Nov. 16, 2023. The entirety of the above-mentioned patent application is hereby incorporated by reference herein and made a part of this specification.

BACKGROUND

Technical Field

The disclosure relates to an upper support assembly that connects a shock absorber and a vehicle body.

Description of Related Art

Conventionally, an upper support that connects a shock absorber and a vehicle body in a vehicle has been known. For example, International Publication No. 2019/146625 (Patent Document 1) has disclosed such an upper support.

As shown in FIG. 1, etc. of Patent Document 1, a spring insulator or the like overlapped with the upper end portion of a coil spring, into which a shock absorber is inserted, is attached to the upper support, and these components form an upper support assembly.

In Patent Document 1, as shown in FIG. 1, etc., the spring insulator is externally fitted and mounted to an external member of the upper support. However, with such a structure, if the structure of the upper support, particularly the structure of the external member, is changed or if the upper support is made smaller (reduced in diameter), it may be difficult to attach the spring insulator to the upper support, and it may be necessary to change the design for the spring insulator or create a new molding die.

The disclosure provides an upper support assembly having a novel structure in which changes to the structure and size of an upper support are less likely to affect the attachment of a spring insulator.

Exemplary aspects for understanding the disclosure will be described hereinafter. However, each aspect described below is illustrative, and may be adopted in combination with each other as appropriate. Furthermore, the multiple components described in each aspect may be recognized and adopted independently where possible, and may also be adopted in combination with any of the components described in another aspect as appropriate. Thus, the disclosure is not limited to the aspects described below, and various alternative aspects can be realized.

SUMMARY

The first aspect is an upper support assembly which includes an upper support attaching a shock absorber to a vehicle body, in which the upper support has a cylindrical holder for mounting a bound stopper, and the cylindrical holder protrudes downward from a portion that is overlapped with and fixed to the vehicle body. The cylindrical holder has a tapered cylindrical shape that decreases in diameter toward a protruding tip, and a spring insulator overlapped with an upper end portion of a coil spring, into which the shock absorber is inserted, is fitted and mounted to an outer peripheral surface of the cylindrical holder.

According to the upper support assembly having a structure in accordance with this aspect, the spring insulator is attached to the upper support via the cylindrical holder. Therefore, for example, even if the shape or size of the upper support is changed, the shape or size of the cylindrical holder can be maintained, thereby preventing influence on the attachment of the spring insulator.

In addition, since the cylindrical holder to which the spring insulator is externally fitted and mounted has a tapered cylindrical shape that decreases in diameter toward the tip, the spring insulator can be easily inserted from the tip side of the cylindrical holder, and the spring insulator can be easily attached to the cylindrical holder.

In the second aspect, in the upper support assembly described in the first aspect, the cylindrical holder has a protruding tip portion at which a retaining protrusion protruding outward is provided, and a removal prevention mechanism of the spring insulator is formed based on a hooking action to the retaining protrusion.

According to the upper support assembly having a structure in accordance with this aspect, the spring insulator is caught on the retaining protrusion of the cylindrical holder in the axial direction, thereby preventing the spring insulator from coming off from the cylindrical holder.

In the third aspect, in the upper support assembly described in the first or second aspect, the spring insulator includes an annular plate-shaped sheet-like portion that is overlapped with an end portion of the coil spring, and a fitting cylindrical portion that is fitted and mounted to the cylindrical holder, and an inner peripheral surface of the fitting cylindrical portion is a tapered surface corresponding to the outer peripheral surface of the cylindrical holder.

According to the upper support assembly having a structure in accordance with this aspect, the inner peripheral surface of the fitting cylindrical portion of the spring insulator is a tapered surface that decreases in diameter away from the sheet-like portion, so that the fitting cylindrical portion can be externally fitted to the cylindrical holder from the sheet-like portion side easily.

In the fourth aspect, in the upper support assembly described in the third aspect, the fitting cylindrical portion of the spring insulator has both axial end portions of the inner peripheral surface formed into curved expanding surfaces that expand outward in an arc shape toward an axially outer side, and a radius of curvature of one of the curved expanding surfaces provided on the sheet-like portion side of the spring insulator is larger than a radius of curvature of the other of the curved expanding surfaces provided on an opposite side to the sheet-like portion.

According to the upper support assembly having a structure in accordance with this aspect, the curved expanding surface is provided on the inner peripheral surface of the fitting cylindrical portion of the spring insulator, making it easy to insert the cylindrical holder into the fitting cylindrical portion when externally fitting and mounting the fitting cylindrical portion to the cylindrical holder. In particular, by increasing the radius of curvature of the curved expanding surface on the sheet-like portion side, it becomes easy to insert the cylindrical holder into the fitting cylindrical portion from the sheet-like portion side.

Furthermore, by setting the curved expanding surface, when externally fitting and mounting the fitting cylindrical portion to the cylindrical holder, the axial end portion of the fitting cylindrical portion can be prevented from rubbing against the outer peripheral surface of the cylindrical holder and being damaged, or from increasing resistance.

In addition, by reducing the radius of curvature of the curved expanding surface on the opposite side to the sheet-like portion in the fitting cylindrical portion of the spring insulator, when the retaining protrusion described in the second aspect as described below is provided on the cylindrical holder, for example, the fitting cylindrical portion of the spring insulator is more likely to get caught on the retaining protrusion, which more effectively prevents the spring insulator from falling off.

In the fifth aspect, in the upper support assembly described in any one of the first to fourth aspects, the upper support has a separate cup metal fitting attached thereto, a bottom wall portion of the cup metal fitting is overlapped with and fixed to the upper support, and the cylindrical holder is formed by a peripheral wall portion of the cup metal fitting.

According to the upper support assembly having a structure in accordance with this aspect, the cylindrical holder is formed by the cup metal fitting separate from the upper support, thereby allowing greater freedom in the shapes of the upper support and the cylindrical holder compared to a case where the cylindrical holder is integrally formed with the upper support. In particular, it becomes easy to set a tapered cylindrical shape to the peripheral wall portion of the cup metal fitting that constitutes the cylindrical holder.

The size and specific shape of the cup metal fitting are not limited, and as exemplified in the embodiments described below, for example, the outer diameter dimension of the peripheral wall portion of the cup metal fitting may be made larger over the entire length than the outer diameter dimension of the cylindrical portion of the bracket metal fitting to which the vibration isolator main body is mounted, thereby improving the positioning accuracy of the mounted spring insulator, and/or the outer diameter dimension of the retaining protrusion formed integrally with the lower end opening edge of the peripheral wall portion of the cup metal fitting may be made larger than the maximum outer diameter dimension of the upper end of the peripheral wall portion, thereby improving the retaining performance of the spring insulator and improving the freedom in dimension setting. Furthermore, the size and specific shape of the spring insulator are not limited, and as exemplified in the embodiments described below, for example, the minimum inner diameter dimension of the portion of the spring insulator which is externally fitted to the peripheral wall portion of the cup metal fitting may be made smaller than the outer diameter dimension of the retaining protrusion of the cup metal fitting either over the entire circumference or partially in the circumferential direction, and/or the minimum inner diameter dimension of the portion of the spring insulator which is positioned above the maximum outer diameter portion on the upper end side of the peripheral wall portion of the cup metal fitting may be made smaller than the maximum outer diameter dimension of the upper end side of the peripheral wall portion of the cup metal fitting either over the entire circumference or partially in the circumferential direction, thereby improving the performance in preventing the spring insulator from shifting downward or coming off.

In the sixth aspect, in the upper support assembly described in the fifth aspect, the spring insulator is not directly attached to the upper support but is attached to the upper support via the cup metal fitting.

According to the upper support assembly having a structure in accordance with this aspect, the spring insulator does not have a portion that is directly attached to the upper support, so that the structure and size of the upper support are less likely to affect the attachment of the spring insulator.

In the seventh aspect, in the upper support assembly described in the fifth or sixth aspect, the upper support and an outer peripheral end portion of the bottom wall portion of the cup metal fitting have a gap therebetween, and the spring insulator has a locking projection that is inserted into the gap to be locked with the cup metal fitting in an axial direction.

According to the upper support assembly having a structure in accordance with this aspect, the locking projection of the spring insulator inserted into the gap is locked with the cup metal fitting in the axial direction, thereby preventing the spring insulator from coming off from the cup metal fitting.

According to the disclosure, in the upper support assembly, changes to the structure and size of the upper support are less likely to affect the attachment of the spring insulator.

DESCRIPTION OF THE EMBODIMENTS

Hereinafter, embodiments of the disclosure will be described with reference to the drawings.

Figure 1:
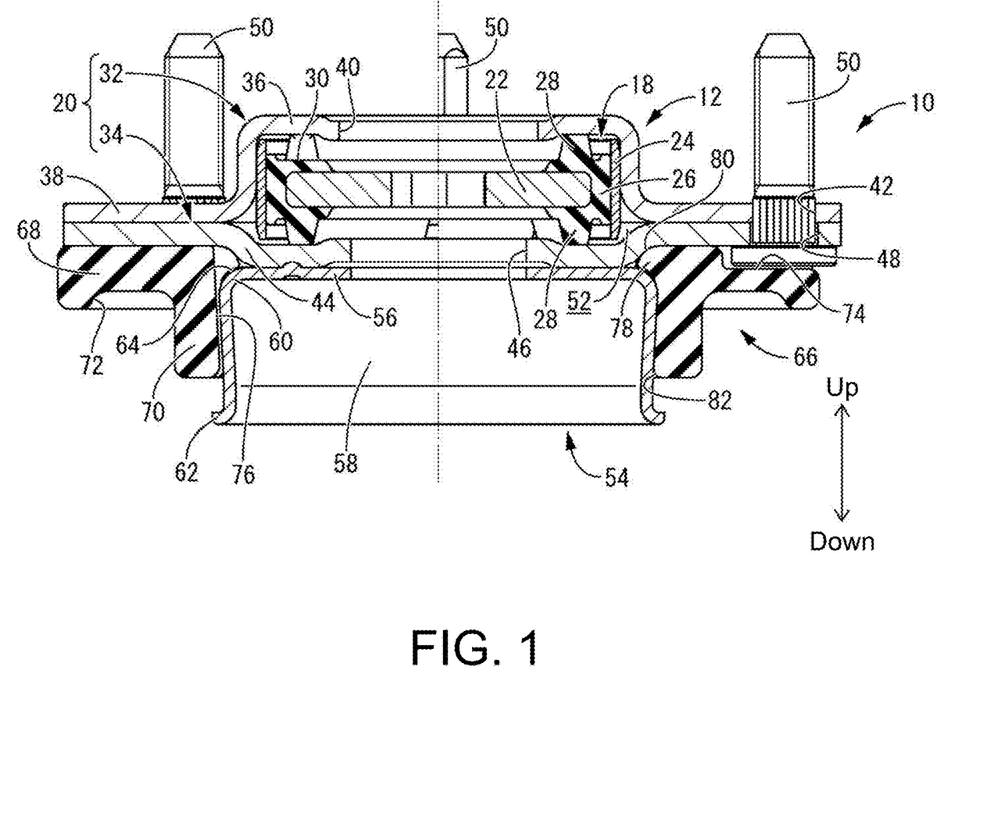
FIG. 1 is a cross-sectional view showing an upper support assembly as the first embodiment of the disclosure, and is a view corresponding to the I-I cross section of FIG. 2.
Figure 2:
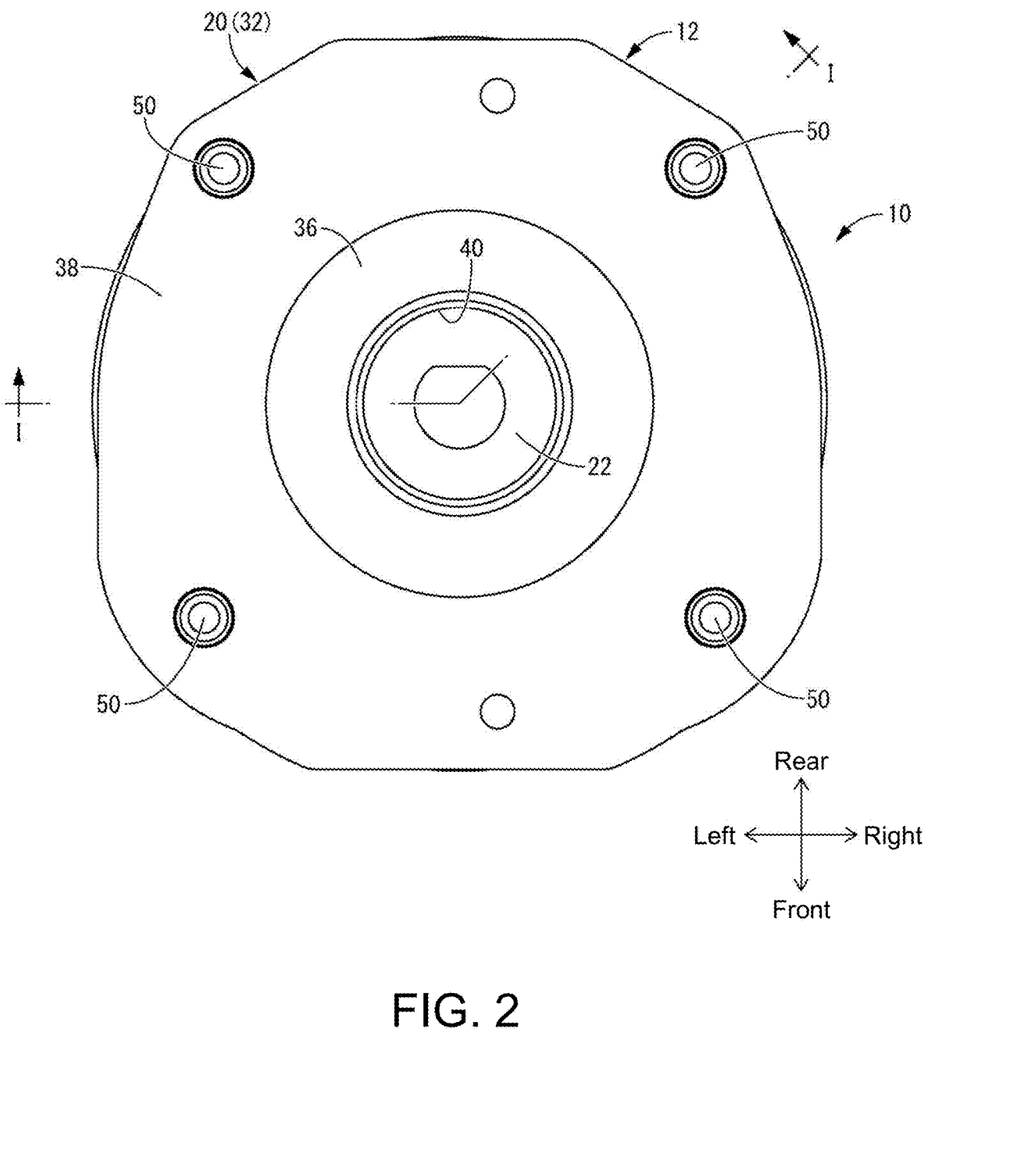
FIG. 2 is a plan view of the upper support assembly shown in FIG. 1.
Figure 3:
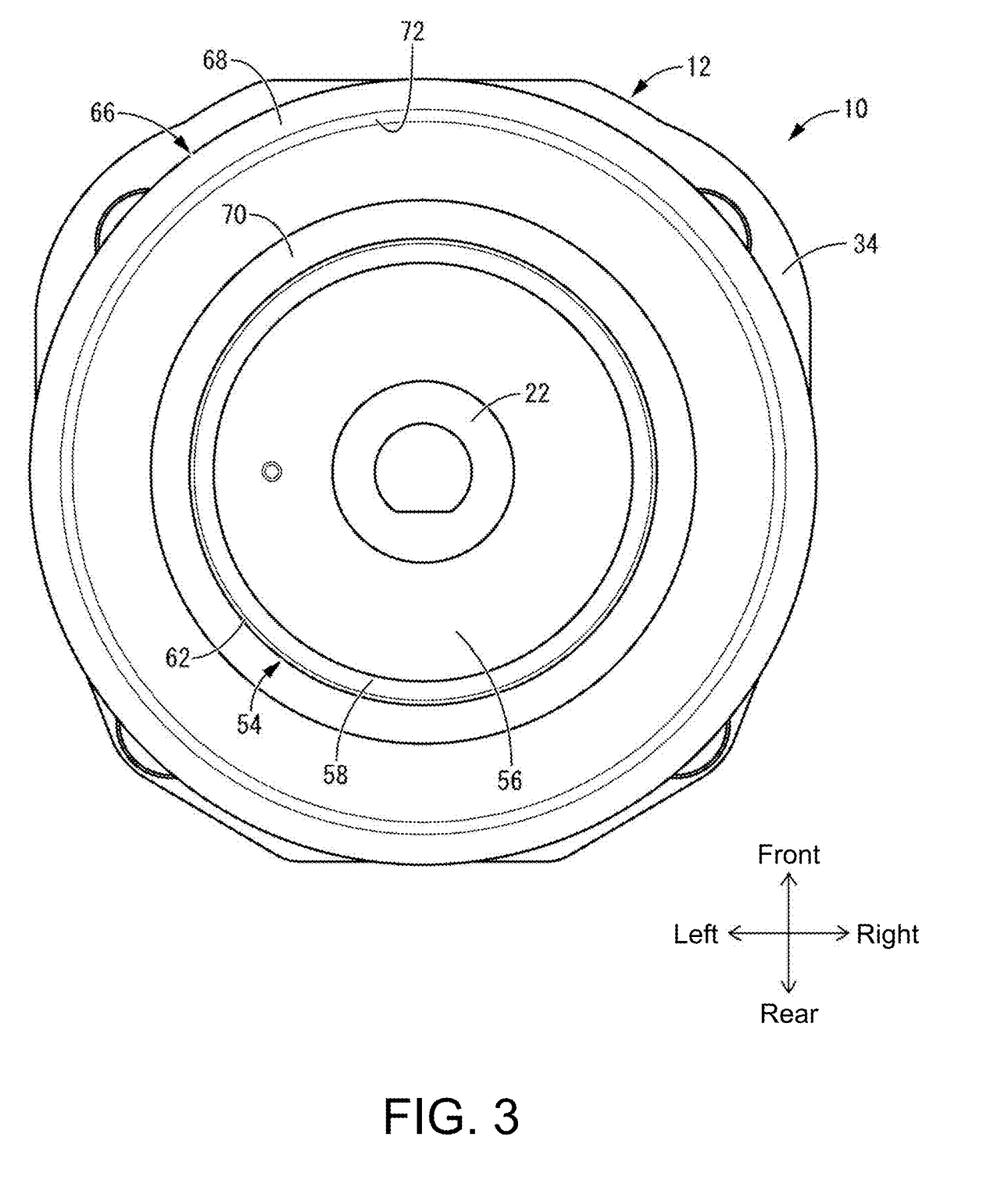
FIG. 3 is a bottom view of the upper support assembly shown in FIG. 1.
Figure 4:
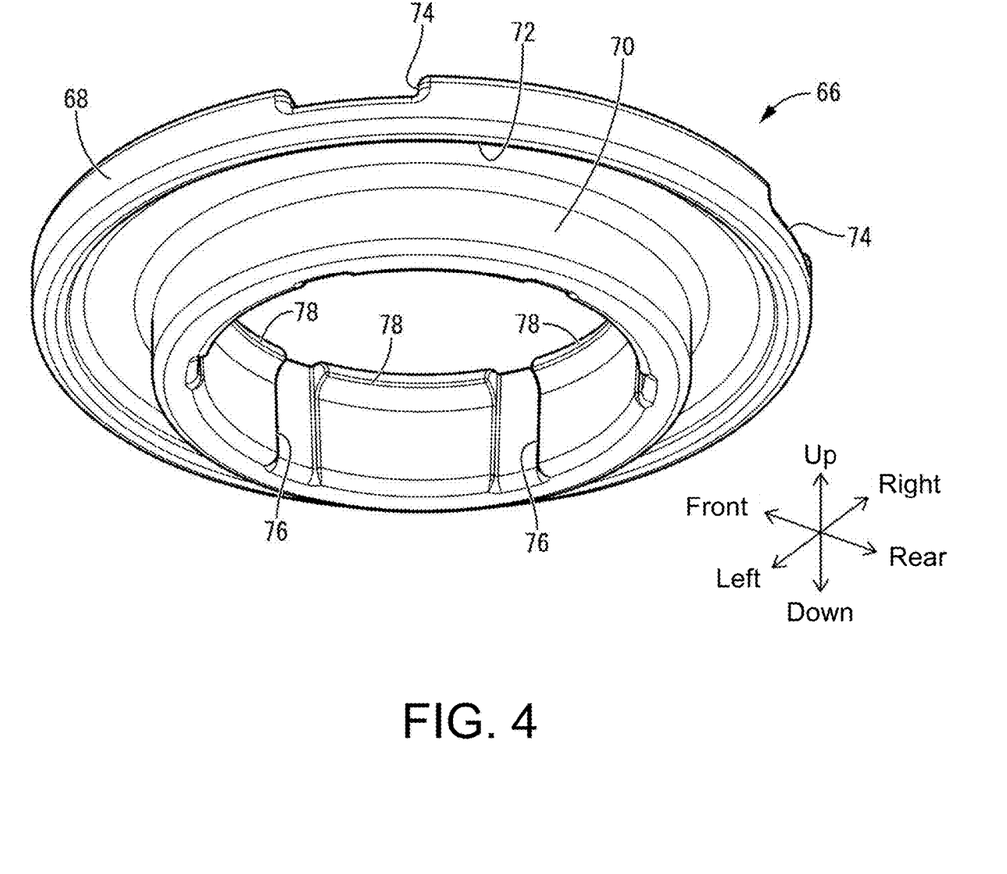
FIG. 4 is a perspective view of a spring insulator constituting the upper support assembly shown in FIG. 1.

FIG. 1 to FIG. 3 show an upper support assembly 10 as the first embodiment of the disclosure. The upper support assembly 10 includes an upper support 12 that connects a shock absorber 84 and a vehicle body 90, which will be described later, in a vibration-isolating manner. In the following description, in principle, the up-down direction refers to the up-down direction in FIG. 1, the front-rear direction refers to the up-down direction in FIG. 2, and the left-right direction refers to the left-right direction in FIG. 2.

The upper support 12 has a structure in which a bracket metal fitting 20 is mounted to a vibration isolator main body 18. Furthermore, the vibration isolator main body 18 has a structure in which an inner member 22 and an outer member 24 are connected by a main body rubber elastic body 26.

The inner member 22 is a hard member made of metal, fiber-reinforced synthetic resin, or the like, and has a substantially annular plate shape. Similar to the inner member 22, the outer member 24 is a hard member made of metal, fiber-reinforced synthetic resin, or the like, and has a substantially cylindrical shape. The outer member 24 has a longer axial length than the inner member 22. The outer member 24 has a larger diameter than the inner member 22, and is disposed in a state of being externally fitted with respect to the inner member 22.

The main body rubber elastic body 26 is provided between the inner member 22 and the outer member 24. The main body rubber elastic body 26 has a substantially annular shape, with the inner peripheral end portion being vulcanized and bonded to the outer peripheral end portion of the inner member 22 and the outer peripheral end portion being vulcanized and bonded to the inner peripheral surface of the outer member 24. Stopper rubbers 28 are integrally formed on the inner peripheral end portion of the main body rubber elastic body 26 to protrude toward the upper and lower sides from the outer peripheral end portion of the inner member 22. Each stopper rubber 28 extends in the circumferential direction with a substantially constant cross section that narrows in the radial direction toward the protruding tip. The stopper rubber 28 of this embodiment has a groove portion 30 that extends in the radial direction in at least a part in the circumferential direction, and is divided in the circumferential direction without being continuous over the entire circumference in the groove portion 30.

The bracket metal fitting 20 is mounted to the outer member 24 of the vibration isolator main body 18. The bracket metal fitting 20 is formed by an upper bracket 32 and a lower bracket 34 which are overlapped with each other in the up-down direction.

The upper bracket 32 is made of metal such as iron, an aluminum alloy, or the like, and has a substantially upside-down dish shape as a whole. The upper bracket 32 integrally includes a cylindrical mount attachment portion 36 with a bottom that opens downward, and a flange-shaped portion 38 that protrudes outward from the lower end portion of the mount attachment portion 36. A circular upper insertion hole 40 is formed in the upper bottom wall portion of the mount attachment portion 36 to penetrate therethrough in the up-down direction. The flange-shaped portion 38 is provided with upper bolt holes 42 that penetrate in the up-down direction at a plurality of positions in the circumferential direction. The upper bracket 32 can be formed, for example, by a pressed metal fitting.

The lower bracket 34 is made of metal such as iron, an aluminum alloy, or the like, and has a plate shape that has substantially the same outer shape as the upper bracket 32 when viewed in the up-down direction. The inner peripheral portion of the lower bracket 34 is positioned slightly below the outer peripheral portion, and the inner peripheral portion and the outer peripheral portion are continuous with each other via a step 44. A circular lower insertion hole 46 is formed in the inner peripheral portion of the lower bracket 34 to penetrate therethrough in the up-down direction. The outer peripheral portion of the lower bracket 34 is provided with lower bolt holes 48 that penetrate in the up-down direction at a plurality of positions in the circumferential direction. The lower bolt holes 48 are formed in the same number as the upper bolt holes 42, and are connected to the upper bolt holes 42 in the up-down direction in a state where the upper bracket 32 and the lower bracket 34 are overlapped in the up-down direction, which will be described later. The lower bracket 34 can be formed, for example, by a pressed metal fitting, similar to the upper bracket 32.

The lower bracket 34 is overlapped with the upper bracket 32 from below. Then, the upper bolt holes 42 of the upper bracket 32 and the lower bolt holes 48 of the lower bracket 34 are connected to each other in the up-down direction, and attachment bolts 50 are inserted from below into these connected upper and lower bolt holes 42 and 48. In addition, the attachment bolt 50 is fitted to the inner peripheral surface of the upper bolt hole 42, and the upper bracket 32 and the lower bracket 34 are positioned in a state of being overlapped with each other by the attachment bolt 50. In this manner, the upper bracket 32 and the lower bracket 34 are connected and positioned relative to each other by the attachment bolts 50, thereby forming the bracket metal fitting 20.

In the bracket metal fitting 20, the mount attachment portion 36 of the upper bracket 32 has a lower opening covered by the lower bracket 34, and an accommodation space 52 is formed between the mount attachment portion 36 and the lower bracket 34. The accommodation space 52 is open upward through the upper insertion hole 40 of the upper bracket 32 and is also open downward through the lower insertion hole 46 of the lower bracket 34.

Then, the vibration isolator main body 18 is accommodated and disposed in the accommodation space 52 of the bracket metal fitting 20. That is, the outer member 24 of the vibration isolator main body 18 is fitted into the mount attachment portion 36 of the upper bracket 32, and the inner peripheral portion of the lower bracket 34 covers the lower part of the mount attachment portion 36, thereby keeping the vibration isolator main body 18 accommodated in the accommodation space 52, so that the bracket metal fitting 20 is mounted to the vibration isolator main body 18.

In the state where the bracket metal fitting 20 is mounted, the inner peripheral portion of the inner member 22 of the vibration isolator main body 18 is exposed to both the upper and lower sides through the upper insertion hole 40 and the lower insertion hole 46. Further, the outer peripheral portion of the inner member 22 is positioned in the up-down direction between the upper bottom wall portion of the mount attachment portion 36 of the upper bracket 32 and the inner peripheral portion of the lower bracket 34. The stopper rubbers 28 protruding to the upper and lower sides from the outer peripheral portion of the inner member 22 are pressed against either the upper bottom wall portion of the mount attachment portion 36 of the upper bracket 32 or the inner peripheral portion of the lower bracket 34.

As shown in FIG. 1 and FIG. 3, a cup metal fitting 54 is attached to the lower bracket 34 of the upper support 12. The cup metal fitting 54 has a substantially cylindrical shape with a bottom that opens downward. The cup metal fitting 54 integrally includes an annular plate-shaped bottom wall portion 56 and a cylindrical peripheral wall portion 58. The outer peripheral end portion of the bottom wall portion 56 of the cup metal fitting 54 is formed into a curved corner portion 60 that is curved in a substantially arc shape in a vertical cross section. The peripheral wall portion 58 serving as a cylindrical holder protrudes downward from the outer peripheral end portion of the bottom wall portion 56. A retaining protrusion 62 that protrudes outward is formed at the lower end portion of the peripheral wall portion 58 of the cup metal fitting 54. The retaining protrusion 62 may be provided partially in the circumferential direction, but in this embodiment, the retaining protrusion 62 is provided continuously over the entire circumference. The retaining protrusion 62 can be formed, for example, by bending the lower end portion of the peripheral wall portion 58 outward.

The peripheral wall portion 58 of the cup metal fitting 54 has a tapered cylindrical shape that decreases in diameter downward. The peripheral wall portion 58 of this embodiment has a diameter that decreases downward on both the inner peripheral surface and the outer peripheral surface. The inclination angle of the peripheral wall portion 58 with respect to the axial direction is not particularly limited, but is desirably set within a range of 1° to 10°, and more preferably set within a range of 2° to 5°, for example. The inclination angle of the peripheral wall portion 58 may be constant in the axial direction, or may vary in the axial direction. The inclination angle of the inner peripheral surface and the inclination angle of the outer peripheral surface of the peripheral wall portion 58 may be different from each other, and in this case, it is desirable that at least the inclination angle of the outer peripheral surface is set within the above numerical range.

The bottom wall portion 56 of the cup metal fitting 54 is overlapped with the lower surface of the inner peripheral portion of the lower bracket 34 of the upper support 12, and fixed by means of welding or the like. Then, the peripheral wall portion 58 of the cup metal fitting 54 is provided to protrude downward from the lower bracket 34 of the upper support 12, and constitutes the cylindrical holder of this embodiment. The curved corner portion 60 of the cup metal fitting 54 is spaced farther downward from the lower surface of the lower bracket 34 as the curved corner portion 60 approaches outward. Then, a gap 64 is formed between the curved corner portion 60 and the lower bracket 34.

In addition, a spring insulator 66 is attached to the upper support 12. The spring insulator 66 is made of a rubber elastic body having rubber-like elasticity or a resin elastomer. As also shown in FIG. 4 to FIG. 7, the spring insulator 66 has a substantially annular shape as a whole. More specifically, the spring insulator 66 integrally includes an annular plate-shaped sheet-like portion 68 and a fitting cylindrical portion 70 that protrudes downward from the inner peripheral end portion of the sheet-like portion 68.

Figure 5:
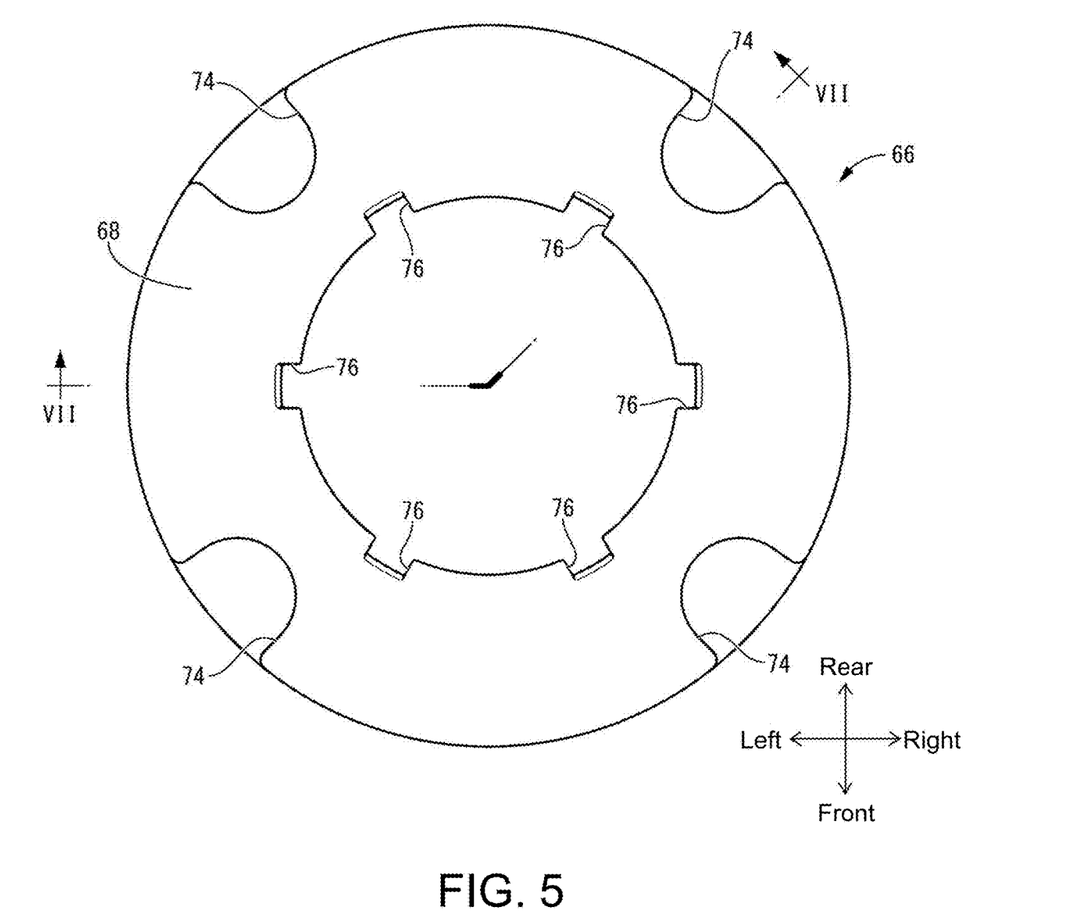
FIG. 5 is a plan view of the spring insulator shown in FIG. 4.
Figure 6:
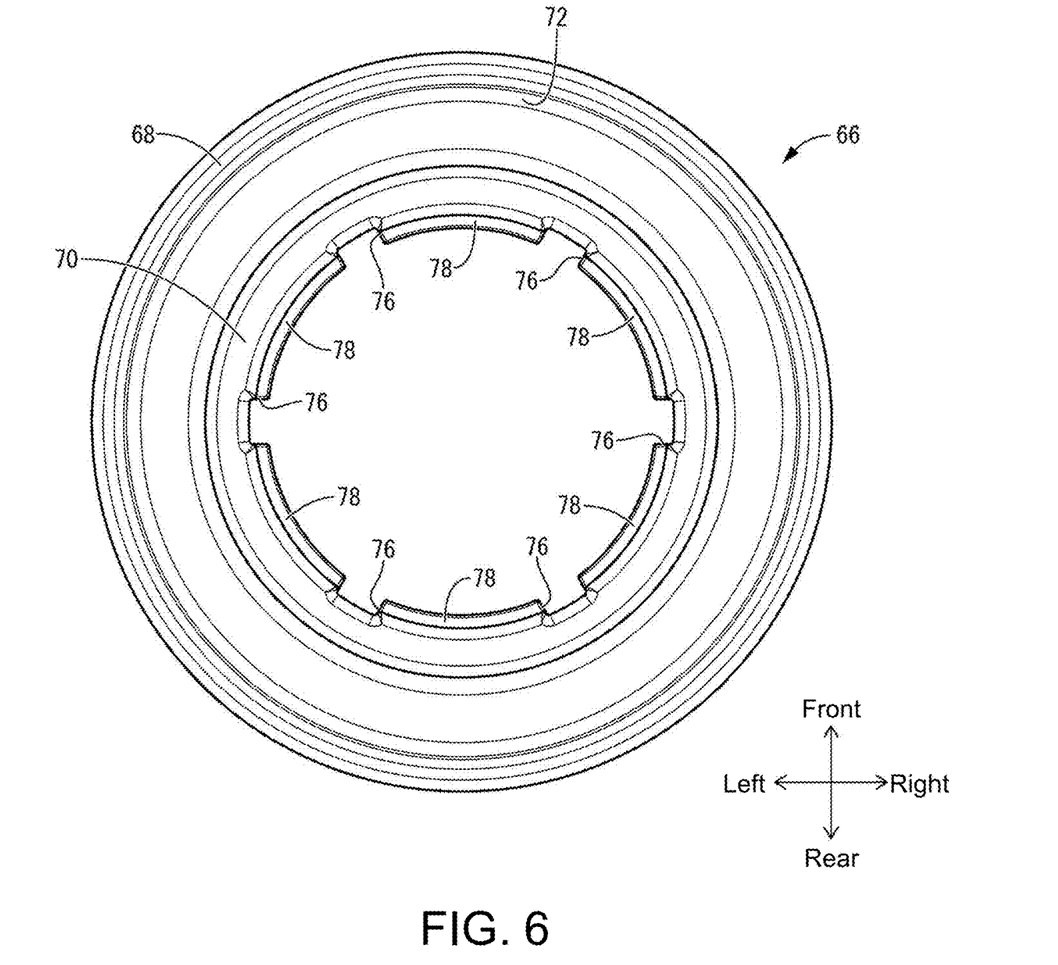
FIG. 6 is a bottom view of the spring insulator shown in FIG. 4.

The sheet-like portion 68 has an annular groove 72 that opens on the lower surface and extends in the circumferential direction. Further, as shown in FIG. 5, the sheet-like portion 68 is provided with notched relief portions 74 that open at the outer peripheral end portion of the upper surface at a plurality of positions in the circumferential direction.

The outer peripheral surface of the fitting cylindrical portion 70 is a cylindrical surface that extends with a substantially constant diameter dimension. The inner peripheral surface of the fitting cylindrical portion 70 is a tapered surface that decreases in diameter downward. The inclination angle θ (see FIG. 7) of the inner peripheral surface of the fitting cylindrical portion 70 with respect to the axial direction is not particularly limited, but is desirably set within a range of 10 to 10°, and more preferably set within a range of 2° to 5°, for example. In this embodiment, the inclination angle θ of the inner peripheral surface of the fitting cylindrical portion 70 is substantially the same as the inclination angle of the outer peripheral surface of the peripheral wall portion 58 of the cup metal fitting 54. Therefore, the inner peripheral surface of the fitting cylindrical portion 70 has a shape corresponding to the outer peripheral surface of the peripheral wall portion 58 of the cup metal fitting 54.

Figure 7:
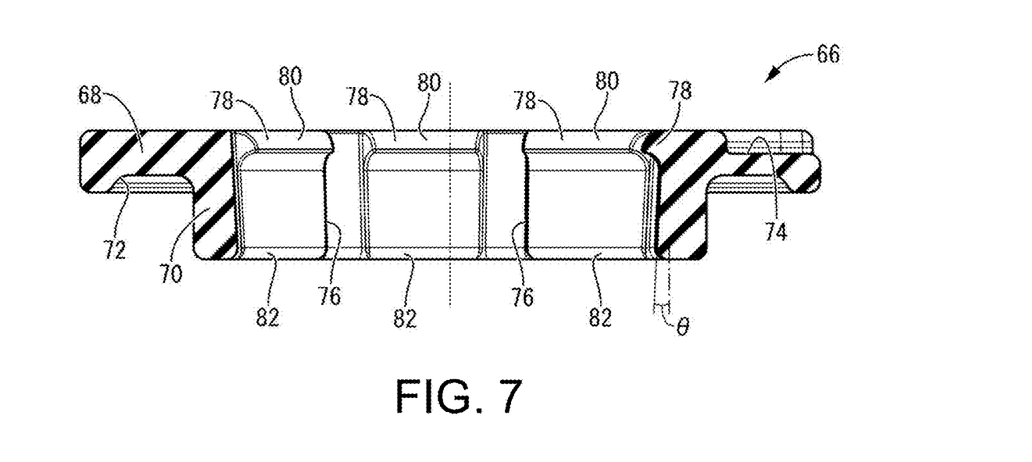
FIG. 7 is a cross-sectional view taken along the line VII-VII of FIG. 5.

The inner diameter dimension of the upper end portion of the fitting cylindrical portion 70, which is the largest diameter, is larger than the outer diameter dimension of the retaining protrusion 62 provided at the lower end portion of the peripheral wall portion 58 of the cup metal fitting 54. Furthermore, the inner diameter dimension of the lower end portion of the fitting cylindrical portion 70, which is the smallest diameter, is smaller than the outer diameter dimension of the retaining protrusion 62 of the cup metal fitting 54.

The fitting cylindrical portion 70 has drainage grooves 76 that open on the inner peripheral surface and extend in the up-down direction at a plurality of positions in the circumferential direction. The drainage grooves 76 of this embodiment are disposed evenly in the circumferential direction.

The upper end portion of the fitting cylindrical portion 70 is provided with a plurality of locking projections 78 that protrude inward. The locking projection 78 has a beak-like vertical cross-sectional shape that narrows in the up-down direction inward. The locking projections 78 are provided respectively between circumferentially adjacent drainage grooves 76 in the circumferential direction. The locking projections 78 are positioned on the inner peripheral side of the sheet-like portion 68 without protruding above or below the sheet-like portion 68.

The upper end portion of the inner peripheral surface of the fitting cylindrical portion 70 is formed into a first curved expanding surface 80, which is one curved expanding surface, and expands outward in an arc shape toward the axially upper side. The first curved expanding surface 80 is the upper surface of the locking projection 78 that has a convex cross-sectional shape, and the inclination angle with respect to the axial direction decreases inward. In addition, the lower end portion of the inner peripheral surface of the fitting cylindrical portion 70 is formed into a second curved expanding surface 82, which is the other curved expanding surface, and expands outward in an arc shape toward the axially lower side. The second curved expanding surface 82 has a convex cross-sectional shape, and the inclination angle with respect to the axial direction decreases inward. The first curved expanding surface 80 and the second curved expanding surface 82 each have an arc shape of approximately ¼ of the circumference in the vertical cross section shown in FIG. 7. The radius of curvature of the first curved expanding surface 80 is larger than the radius of curvature of the second curved expanding surface 82. The radius of curvature of the first curved expanding surface 80 is preferably within a range of 1.2 to 3 times the radius of curvature of the second curved expanding surface 82, and more preferably within a range of 1.5 to 2.5 times.

As shown in FIG. 1, the spring insulator 66 having such a structure is disposed below the upper support 12 with the sheet-like portion 68 overlapped with the outer peripheral portion of the lower bracket 34 of the upper support 12 from below. As shown in FIG. 1, the head of the attachment bolt 50 attached to the bracket metal fitting 20 is received in the relief portion 74 formed in the sheet-like portion 68 of the spring insulator 66. Thus, interference between the head of the attachment bolt 50 and the sheet-like portion 68 is avoided.

The lower bracket 34 of the upper support 12 has a substantially plate shape, and although a small step 44 is provided in the radial middle portion, the step 44 is not shaped so that the fitting cylindrical portion 70 of the spring insulator 66 can be externally fitted thereto. Thus, the fitting cylindrical portion 70 of the spring insulator 66 is fitted and mounted to the outer peripheral surface of the peripheral wall portion 58 of the cup metal fitting 54 which is fixed to the lower bracket 34. In this embodiment, the fitting cylindrical portion 70 of the spring insulator 66 is not directly attached to and held by the bracket metal fitting 20 of the upper support 12, but is directly held only by the cup metal fitting 54, and is indirectly held to the bracket metal fitting 20 via the cup metal fitting 54. Furthermore, the inner diameter dimension of the fitting cylindrical portion 70 of the spring insulator 66 is made smaller than the outer diameter dimension of the peripheral wall portion 58 of the cup metal fitting 54 over the entire axial length of the mounting portion, and the overlapping portions between the outer peripheral surface of the cup metal fitting 54 and the inner peripheral surface of the fitting cylindrical portion 70 abut with a tightening margin over the entire range.

In this manner, even if the lower bracket 34 of the upper support 12 that is adopted has a plate shape and has no portion for supporting the spring insulator 66, the spring insulator 66 can be indirectly attached to the upper support 12 via the cup metal fitting 54 by utilizing the cup metal fitting 54 that is fixed to the lower bracket 34 and protrudes downward.

Since the spring insulator 66 is indirectly attached to the bracket metal fitting 20 of the upper support 12 via the cup metal fitting 54, even if the structure of the lower bracket 34 of the upper support 12 is changed, for example, the change is less likely to affect the attachment of the spring insulator 66 to the upper support 12. That is, even if the lower bracket 34 is changed, as long as there is no change to the peripheral wall portion 58 of the cup metal fitting 54, the spring insulator 66 can be attached to the upper support 12 without any problem. Therefore, even if there are differences in the bracket metal fitting 20 due to changes in vehicle design or differences in vehicle model, a common spring insulator 66 can be easily adopted. Particularly, in this embodiment, the spring insulator 66 is not directly attached to the lower bracket 34, so differences in the lower bracket 34 are less likely to affect the attachment of the spring insulator 66 to the upper support 12.

The peripheral wall portion 58 of the cup metal fitting 54 has a tapered shape that decreases in diameter downward, that is, toward the tip side protruding from the bottom wall portion 56. Therefore, when inserting the peripheral wall portion 58 of the cup metal fitting 54 into the fitting cylindrical portion 70 of the spring insulator 66 from below, interference between the lower end portion of the cup metal fitting 54 and the upper end portion of the spring insulator 66 is easily avoided, making the insertion easy. Therefore, the work of externally fitting the spring insulator 66 to the cup metal fitting 54 is simplified, and the upper support assembly 10 can be manufactured easily.

Moreover, the inner peripheral surface of the fitting cylindrical portion 70 of the spring insulator 66 is a tapered cylindrical surface corresponding to the outer peripheral surface of the peripheral wall portion 58 of the cup metal fitting 54, and the inner diameter dimension increases upward. Then, in this embodiment, the outer diameter dimension of the lower end portion of the peripheral wall portion 58 of the cup metal fitting 54 is smaller than the inner diameter dimension of the upper end opening of the fitting cylindrical portion 70 of the spring insulator 66. Therefore, when the peripheral wall portion 58 of the cup metal fitting 54 is inserted to the inner periphery of the fitting cylindrical portion 70 from above, interference between the cup metal fitting 54 and the spring insulator 66 is more easily avoided, making it easier to externally fit and mount the spring insulator 66 to the cup metal fitting 54. Since the outer diameter dimension of the upper end portion of the peripheral wall portion 58 of the cup metal fitting 54 is larger than the inner diameter dimension of the upper end opening of the fitting cylindrical portion 70 of the spring insulator 66, the spring insulator 66 is fitted to the upper end portion of the cup metal fitting 54 with sufficient holding force.

Furthermore, as the inner peripheral surface of the upper end opening of the fitting cylindrical portion 70 of the spring insulator 66 is formed into the first curved expanding surface 80, even if the lower end portion of the peripheral wall portion 58 of the cup metal fitting 54 interferes with the upper end opening of the fitting cylindrical portion 70, the cup metal fitting 54 is guided to the inner periphery of the fitting cylindrical portion 70 by abutting against the first curved expanding surface 80. Therefore, the lower end portion of the cup metal fitting 54 and the upper end portion of the spring insulator 66 are less likely to get caught by each other, and the spring insulator 66 can be attached to the cup metal fitting 54 more easily and stably. In this embodiment, the radius of curvature of the first curved expanding surface 80 is made larger than the radius of curvature of the second curved expanding surface 82, which can effectively achieve the guiding action of the cup metal fitting 54 abutting against the first curved expanding surface 80.

The lower end portion of the peripheral wall portion 58 of the cup metal fitting 54 is provided with the retaining protrusion 62 that protrudes outward. The outer diameter dimension of the retaining protrusion 62 is larger than the inner diameter dimension of the lower end portion of the spring insulator 66. Then, the spring insulator 66, which is externally fitted and mounted to the peripheral wall portion 58 of the cup metal fitting 54, has the amount of downward relative displacement with respect to the peripheral wall portion 58 limited by the hooking action due to locking with the retaining protrusion 62 in the axial direction. This forms a removal prevention mechanism that prevents the spring insulator 66 from coming off downward with respect to the cup metal fitting 54 when the upper support assembly 10 is in a single component state. In this embodiment, since the radius of curvature of the second curved expanding surface 82 provided at the lower end of the fitting cylindrical portion 70 of the spring insulator 66 is made smaller than the radius of curvature of the first curved expanding surface 80, the retaining protrusion 62 is less likely to overcome the second curved expanding surface 82, and the locking between the retaining protrusion 62 and the inner peripheral end portion of the fitting cylindrical portion 70 effectively prevents the spring insulator 66 from falling off from the cup metal fitting 54.

The locking projections 78 protruding inward from the upper end portion of the fitting cylindrical portion 70 of the spring insulator 66 are inserted into the gap 64 formed between the lower bracket 34 of the upper support 12 and the curved corner portion 60 of the cup metal fitting 54. Thus, the locking projections 78 are locked in the axial direction with respect to the curved corner portion 60 of the cup metal fitting 54, making it difficult for the spring insulator 66 to displace downward relative to the cup metal fitting 54. Thus, the spring insulator 66 is prevented from falling off from the cup metal fitting 54, and particularly the spring insulator 66 is easily held at the initial position where the sheet-like portion 68 and the lower surface of the lower bracket 34 are overlapped.

In the state where the spring insulator 66 is disposed at the initial position where the sheet-like portion 68 and the lower bracket 34 are overlapped, the retaining protrusion 62 is spaced below the fitting cylindrical portion 70. Therefore, in the case where the locking between the locking projections 78 and the curved corner portion 60 of the cup metal fitting 54 is released and the spring insulator 66 is displaced downward from the initial position with respect to the cup metal fitting 54, a removal prevention mechanism for preventing the spring insulator 66 from coming off is formed by the locking between the retaining protrusion 62 and the fitting cylindrical portion 70. Thus, in the upper support assembly 10 of this embodiment, a first removal prevention mechanism using the locking projections 78 and a second removal prevention mechanism using the retaining protrusion 62 are provided to more reliably prevent the spring insulator 66 from coming off from the cup metal fitting 54.

The fitting cylindrical portion 70 of the spring insulator 66 is spaced outward from the peripheral wall portion 58 of the cup metal fitting 54 in the portion where the drainage grooves 76 are formed. Thus, even if water seeps above the fitting portion between the fitting cylindrical portion 70 and the peripheral wall portion 58, the water is quickly drained downward through the drainage grooves 76.

Figure 8:
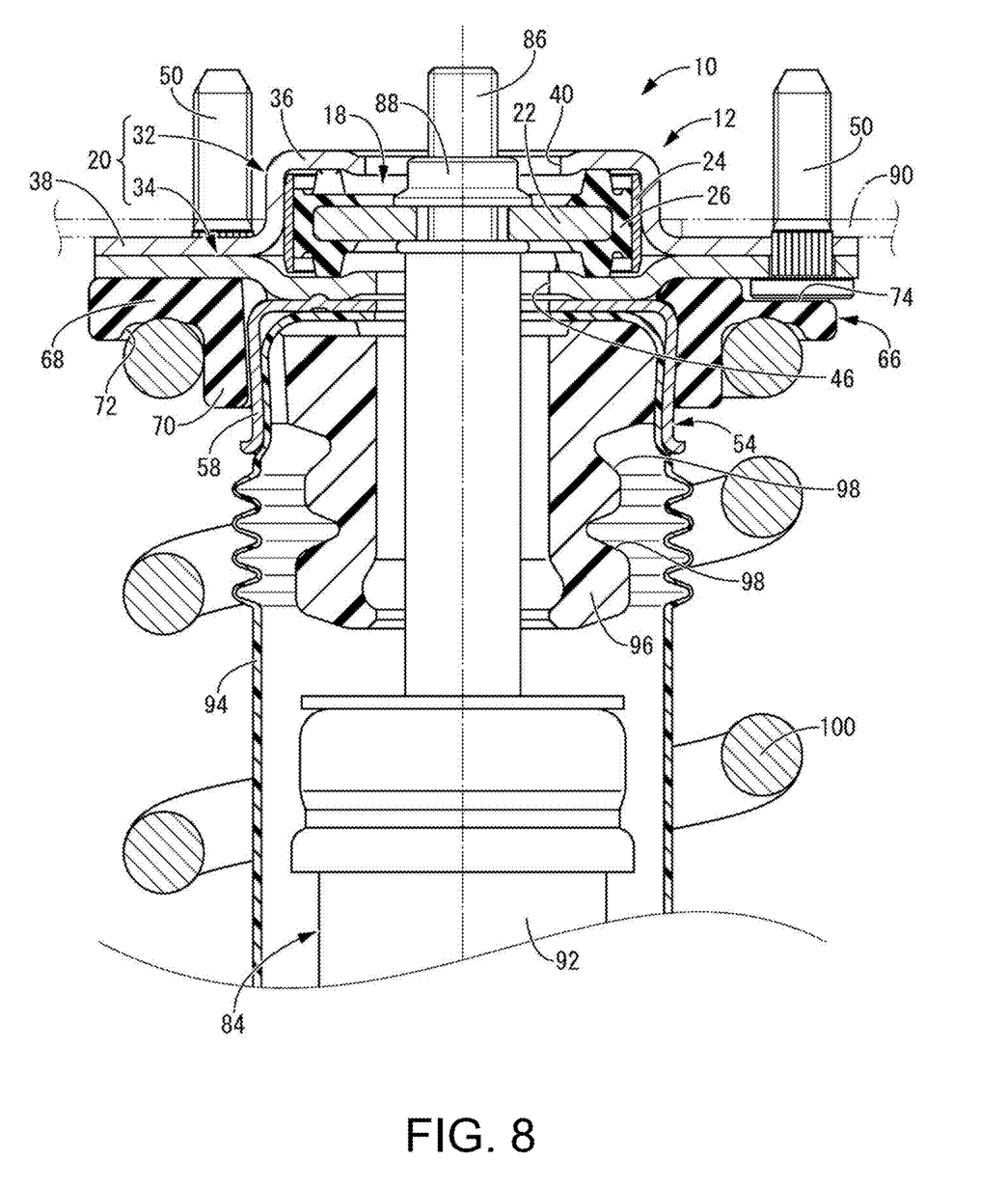
FIG. 8 is a cross-sectional view showing the upper support assembly shown in FIG. 1 in a state of being mounted to a vehicle.

The upper support assembly 10 constitutes a suspension mechanism of a vehicle, for example, as shown in FIG. 8. That is, a piston rod 86 of the shock absorber 84 is inserted through the inner member 22 of the upper support 12, and the inner member 22 is fixed to the piston rod 86 by a nut 88. Additionally, the outer member 24 of the upper support 12 is fixed to the vehicle body 90 by the attachment bolts 50 of the bracket metal fitting 20. That is, the upper support 12 includes the vibration isolator main body 18 to which the shock absorber 84 is attached, and the bracket metal fitting 20 to which the vehicle body 90 is attached. The bracket metal fitting 20 includes the flange-shaped portion 38 as a portion which is overlapped with the vehicle body 90 and fixedly attached with the attachment bolts 50. In this manner, the shock absorber 84 of the suspension mechanism and the vehicle body 90 are connected in a vibration-isolating manner via the upper support 12. When such an upper support 12 is mounted to a vehicle, the peripheral wall portion 58 of the cup metal fitting 54 protrudes from the bracket metal fitting 20 (lower bracket 34) of the upper support 12 toward a cylinder 92 of the shock absorber 84.

In this embodiment, the upper bracket 32 of the upper support 12 has an upside-down dish shape and the lower bracket 34 has a plate shape, so the fastening surface of the upper support 12 to the vehicle body 90 (the upper surface of the flange-shaped portion 38 of the upper bracket 32) is located below the vertical center of the upper support 12. In addition, since the lower bracket 34 has a plate shape and the downward protrusion of the lower bracket 34 is suppressed, a large space can be secured below the upper support 12.

A dust cover 94 is attached to the cup metal fitting 54. The dust cover 94 is made of, for example, synthetic resin and has a thin-walled and substantially cylindrical shape with a bottom. Then, the upper end portion of the dust cover 94 is fitted to the inner periphery of the peripheral wall portion 58 of the cup metal fitting 54. Although the dust cover 94 of this embodiment has a bellows structure with a partially corrugated cross section in the axial direction, the entire dust cover 94 may have a bellows structure or may not have a bellows structure.

In addition, abound stopper 96 is fitted into the cup metal fitting 54. The bound stopper 96 is, for example, a component made of synthetic resin such as urethane foam and has elasticity in the up-down direction. The bound stopper 96 has a substantially columnar shape as a whole. The bound stopper 96 is formed with two recesses 98 that open on the outer peripheral surface. The bound stopper 96 is disposed on the inner periphery of the dust cover 94, with the upper portion being fitted into the inner periphery of the cup metal fitting 54 together with the upper end portion of the dust cover 94, and the lower portion protruding below the cup metal fitting 54. Then, the bracket metal fitting 20 of the upper support 12 and the cylinder 92 of the shock absorber 84 come into contact with each other via the bound stopper 96, thereby limiting the amount of contraction of the shock absorber 84.

In this embodiment, the inner peripheral surface of the peripheral wall portion 58 of the cup metal fitting 54 has a tapered shape that decreases in diameter downward, making it difficult for the dust cover 94 and the bound stopper 96 fitted into the peripheral wall portion 58 to come off downward from the cup metal fitting 54. The peripheral wall portion 58 of the cup metal fitting 54 serves as a cylindrical holder for mounting the bound stopper 96.

A coil spring 100 is disposed below the upper support 12. The coil spring 100 is disposed with the shock absorber 84 inserted thereinto. The coil spring 100 has the upper end portion inserted into the groove portion 30 of the sheet-like portion 68 of the spring insulator 66 and overlapped on the lower surface of the sheet-like portion 68, and the upper end portion is externally fitted to the fitting cylindrical portion 70 of the spring insulator 66. In this manner, the coil spring 100 is indirectly pressed from below against the outer peripheral portion of the lower bracket 34 via the sheet-like portion 68 of the spring insulator 66. Furthermore, as the spring insulator 66 is interposed between the lower bracket 34 and the coil spring 100, the generation of abnormal noise and damage caused by direct contact between the lower bracket 34 and the coil spring 100 are prevented. When the upper support assembly 10 is mounted to a vehicle, the urging force of the coil spring 100 acts upward on the spring insulator 66, so the spring insulator 66 does not fall off downward from the cup metal fitting 54.

Although the embodiments of the disclosure have been described in detail above, the disclosure is not limited to the specific description. For example, the locking projections 78 that protrude from the inner peripheral surface of the spring insulator 66 may be omitted, and the spring insulator 66 can be held on the cup metal fitting 54 simply by the fitting force of the fitting cylindrical portion 70 against the peripheral wall portion 58 of the cup metal fitting 54. In addition, for example, concave locking recesses that open on the outer peripheral surface of the peripheral wall portion 58 (cylindrical holder) of the cup metal fitting 54 may be formed in the axial middle portion of the peripheral wall portion 58, and the locking projections 78 may be inserted into the locking recesses to be locked in the axial direction.

In the above embodiment, the upper surface of the locking projection 78 is the first curved expanding surface 80, but one curved expanding surface may be provided in a portion away from the locking projection 78. Therefore, one curved expanding surface can also be provided on a spring insulator with no locking projection.

The locking projection 78 may be provided partially in the circumferential direction, making it easy for the cup metal fitting 54 to overcome the inner periphery of the locking projection 78 from below to above, and facilitating the attachment of the spring insulator 66 to the cup metal fitting 54.

In the above embodiment, the spring insulator 66 is attached only to the cup metal fitting 54 without being directly attached to the lower bracket 34 of the upper support 12. However, for example, the height of the step 44 of the lower bracket 34 may be increased to attach the lower part of the fitting cylindrical portion 70 to the cup metal fitting 54 and attach the upper part of the fitting cylindrical portion 70 to the step 44 of the lower bracket 34. In short, it is desirable that the spring insulator 66 be attached only to the cup metal fitting 54 and not directly to the bracket metal fitting 20, but the spring insulator 66 can also be attached to other members such as the bracket metal fitting 20 as long as the spring insulator 66 is attached to the cup metal fitting 54.

The inner peripheral surface of the fitting cylindrical portion 70 of the spring insulator 66 does not necessarily have a tapered shape corresponding to the outer peripheral surface of the peripheral wall portion 58 of the cup metal fitting 54. For example, if the inner peripheral surface of the fitting cylindrical portion 70 has a shape that is non-inclined in the axial direction, when the spring insulator 66 is fitted from below to above to the peripheral wall portion 58 of the cup metal fitting 54, the tightening margin of the fitting cylindrical portion 70 increases upward, making it possible to more effectively prevent axial misalignment of the fitting cylindrical portion 70 relative to the cup metal fitting 54.

In the above embodiment, the overlapping portions between the cup metal fitting 54 and the spring insulator 66 are fitted together with a tightening margin over the entire range in the axial direction, but the overlapping portions between the cup metal fitting 54 and the spring insulator 66 may be fitted together with a partial tightening margin in the axial direction. For example, only the upper end portions may be fitted together. According to this, it becomes easier to attach the spring insulator 66 to the cup metal fitting 54.

The above embodiment illustrates a structural example in which the cylindrical holder for holding the spring insulator 66 is formed by the cup metal fitting 54 that is separate from the bracket metal fitting 20 of the upper support 12, but the cylindrical holder may be formed integrally with, for example, the lower bracket 34 of the upper support 12.

In the cup metal fitting 54, the retaining protrusion 62 is not essential and may be omitted. Furthermore, the retaining protrusion 62 of the cup metal fitting 54 may be provided partially in the circumferential direction, and the portion of the spring insulator 66 that is locked to the retaining protrusion 62 may be provided partially in the circumferential direction. In addition, the retaining protrusion 62 may also be provided in the middle portion of the peripheral wall portion 58, for example, by partially expanding the diameter of the axial middle portion of the peripheral wall portion 58 of the cup metal fitting 54, so that the retaining protrusion 62 can be disposed at a position to be locked to the lower end of the spring insulator 66 at the initial position.

In the above embodiment, the outer diameter dimension of the cup metal fitting 54 and the inner diameter dimension of the spring insulator 66 are substantially constant in the circumferential direction, but the outer diameter dimension of the cup metal fitting 54 and the inner diameter dimension of the spring insulator 66 may vary in the circumferential direction. For example, at least one of the outer peripheral surface of the cup metal fitting 54 and the inner peripheral surface of the spring insulator 66 may be changed in the circumferential direction, so that the spring insulator 66 is partially fitted to the cup metal fitting 54 in the circumferential direction. According to this, it becomes easier to attach the spring insulator 66 to the cup metal fitting 54.

What is claimed is:

1. An upper support assembly, comprising:
   an upper support attaching a shock absorber to a vehicle body, wherein the upper support has a cylindrical holder for mounting a bound stopper, and the cylindrical holder protrudes downward from a portion that is overlapped with and fixed to the vehicle body,
   wherein the cylindrical holder has a tapered cylindrical shape that decreases in diameter toward a protruding tip, and
   a spring insulator overlapped with an upper end portion of a coil spring, into which the shock absorber is inserted, is fitted and mounted to an outer peripheral surface of the cylindrical holder.

2. The upper support assembly according to claim 1, wherein the cylindrical holder has a protruding tip portion at which a retaining protrusion protruding outward is provided, and
   a removal prevention mechanism of the spring insulator is formed based on a hooking action to the retaining protrusion.

3. The upper support assembly according to claim 1, wherein the spring insulator comprises an annular plate-shaped sheet-like portion that is overlapped with an end portion of the coil spring, and a fitting cylindrical portion that is fitted and mounted to the cylindrical holder, and
   an inner peripheral surface of the fitting cylindrical portion is a tapered surface corresponding to the outer peripheral surface of the cylindrical holder.

4. The upper support assembly according to claim 3, wherein the fitting cylindrical portion of the spring insulator has both axial end portions of the inner peripheral surface formed into curved expanding surfaces that expand outward in an arc shape toward an axially outer side, and
   a radius of curvature of one of the curved expanding surfaces provided on the sheet-like portion side of the spring insulator is larger than a radius of curvature of the other of the curved expanding surfaces provided on an opposite side to the sheet-like portion.

5. The upper support assembly according to claim 1, wherein the upper support has a separate cup metal fitting attached thereto, a bottom wall portion of the cup metal fitting is overlapped with and fixed to the upper support, and the cylindrical holder is formed by a peripheral wall portion of the cup metal fitting.

6. The upper support assembly according to claim 5, wherein the spring insulator is not directly attached to the upper support but is attached to the upper support via the cup metal fitting.

7. The upper support assembly according to claim 5, wherein the upper support and an outer peripheral end portion of the bottom wall portion of the cup metal fitting have a gap therebetween, and
   the spring insulator has a locking projection that is inserted into the gap to be locked with the cup metal fitting in an axial direction.

* * * * *